Aug. 18, 1959  A. G. CLARK  2,900,485
PORTABLE ELECTRICAL TORCH
Filed March 19, 1957  2 Sheets-Sheet 1
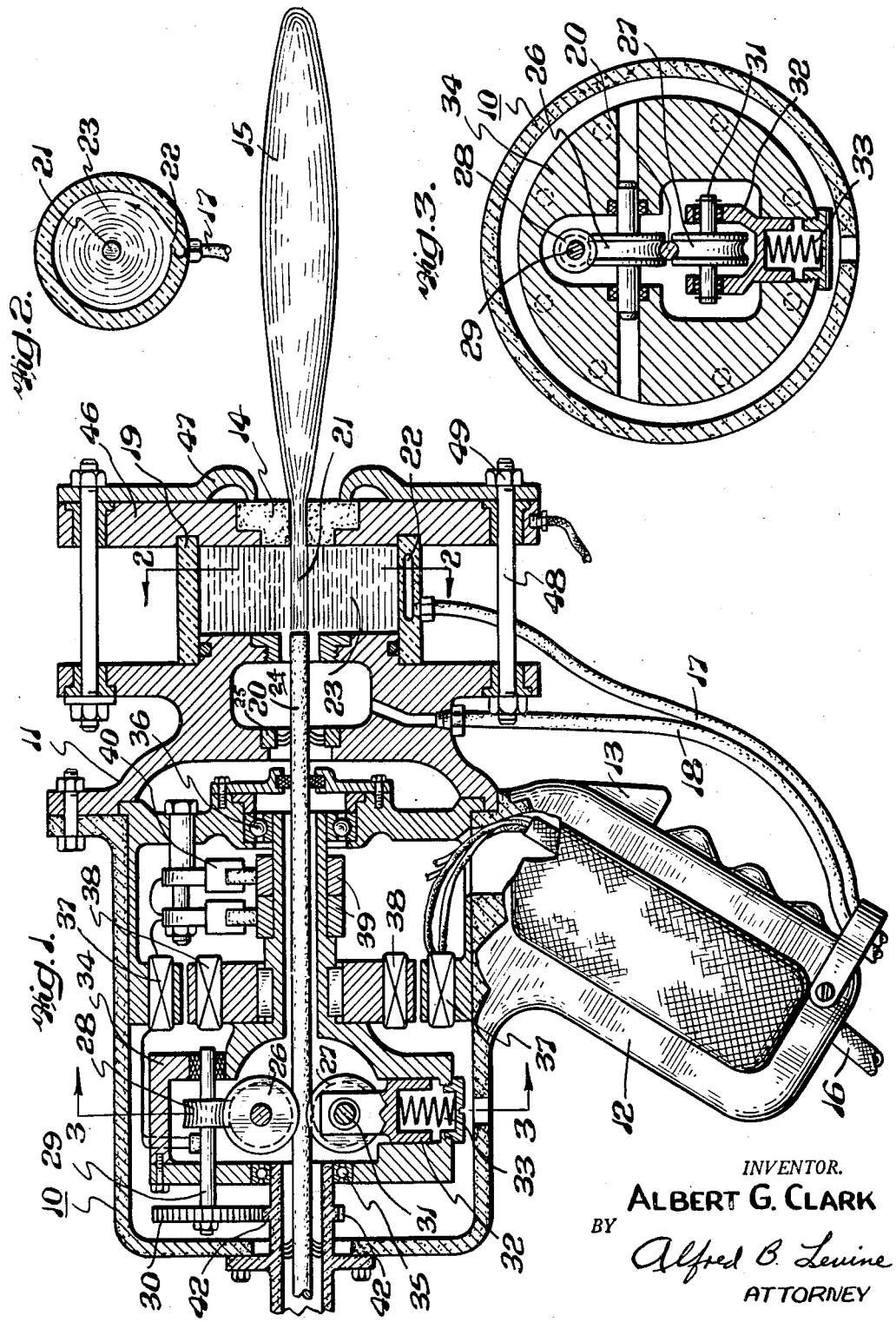
INVENTOR.
ALBERT G. CLARK
BY Alfred C. Levine
ATTORNEY Aug. 18, 1959  A. G. CLARK  2,900,485
PORTABLE ELECTRICAL TORCH
Filed March 19, 1957  2 Sheets-Sheet 2

INVENTOR.
ALBERT G. CLARK
BY
*Alfred B. Levine*
ATTORNEY

United States Patent Office 2,900,485
Patented Aug. 18, 1959

2,900,485

PORTABLE ELECTRICAL TORCH

Albert G. Clark, Wayne, Pa., assignor to General Electric Company, a corporation of New York Application March 19, 1957, Serial No. 647,159

3 Claims. (Cl. 219—75)

This invention generally relates to improvements in portable electrically operated torches for use in cutting, welding, and like applications.

In the art of cutting, welding, and otherwise treating metal and other materials by high temperatures flame, it has been known to use electrical arcs as a source of heat in such a manner as to generate considerably higher temperatures than normally obtainable electrically, or by other means. However, special constructions of this type are rather large and complex; utilizing particularly heavy conduit members as arc chute housings and bulky water jackets for cooling and other undesirable features. As a result, such torches are not readily portable nor conveniently usable outside of the factory or when working with small or oddly shaped objects and the like.

To overcome these disadvantages in accordance with the present invention, there is provided a unique arc torch that is considerably less complex and more compact, and hence readily portable and usable for a greater variety of applications than heretofore. More specifically, there is provided a continuously operating arc torch device that is capable of generating a flame or a plasma having temperature exceeding 9000° C. while being contained in a relatively lightweight housing occupying a volume little greater than the size of a human hand.

It is accordingly one object of the present invention to provide a continuously operating portable torch capable of generating flame temperatures exceeding 9000° C.

A further object is to provide such a torch employing a uniquely combined flame temperature increasing means and efficient cooling system.

A still further object is to provide such a torch adapted to generate a substantially constant temperature flame over long time periods.

Still another object is to provide such a torch that is unusually lightweight and occupies a small volume.

Figure 5:
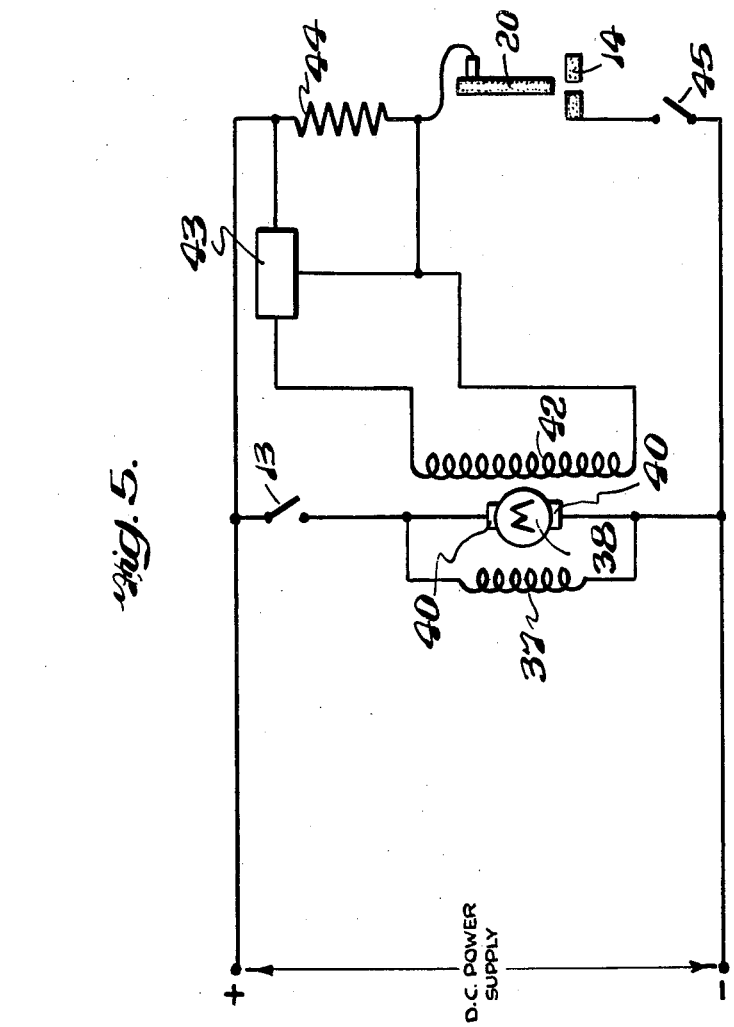
Figure 4:
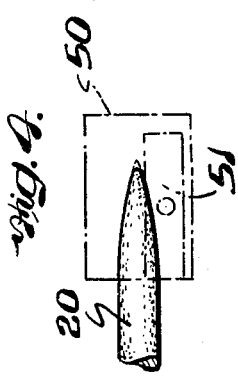

Other objects and many attendant advantages will be more readily comprehended by those skilled in the art upon a detailed consideration of the following specification taken with the accompanying drawings wherein:

Fig. 1 is a cross sectional view, in side elevation, depicting one preferred torch incorporating the present invention, Fig. 2 is an end sectional view through lines 2—2 of Fig. 1, Fig. 3 is an end sectional view through lines 3—3 of Fig. 1, Fig. 4 is a diagrammatic view of an attachment to Fig. 1, and Fig. 5 is an electrical schematic drawing illustrating a preferred actuating and control system for the torch of Fig. 1.

Briefly in accordance with this preferred embodiment, there is provided a means for generating a high intensity arc of relatively short length together with means for providing a relatively large body of moving fluid about the arc serving to both confine its cross section, and hence greatly increase its current density and temperature, as well as providing all of the necessary cooling of the complete mechanism to eliminate water jackets and heavy heat resistant housings and the like. Additionally, there is provided a means for automatically adjusting the separation or spacing of the arc electrodes and the relative rotative positions thereof in such a manner as to continuously maintain substantially constant flame temperature and flame velocity over long periods of time.

Referring to Fig. 1, there is shown an electrically operated portable torch generally designated 10, comprised of a housing 11 to which is attached a hand gripping means 12 and manually operated switch 13 and having an electrode nozzle 14 for transmitting an extremely high temperature flame plasma 15. Electrical energy for operating the torch is conducted through wires contained within a suitable electrical cable 16 leading into the hand gripping portion 12, and water or other fluid or forming the flame plasma and cooling the complete mechanism is conducted through an inlet hose 17 and drained through an outlet hose 18.

As shown, the preferred arc and plasma generating means is comprised of a small generally cylindrically shaped chamber 19 within the forward portion of housing 11, within which is concentrically supported a positively energized rod electrode 20 and a negatively energized ring-shaped electrode nozzle 14, the latter being supported within a suitable opening provided in the right hand end wall of housing 11. A relatively low voltage but high current source of electrical power (not shown) is applied across electrodes 20 and 14 to produce an electrical arc 21 therebetween, as shown.

As is known to those skilled in the art, the greatest temperatures obtainable in the usual electrical arcing means is but a few thousand degrees, since the arc cannot be easily confined within a small volume but rather spreads in space, and as a result, its current density is relatively low. However, by confining this arc within a considerably smaller cross sectional area than it would normally occupy in space, infinitely higher current densities and hence arc temperatures are obtainable. In accordance with the present invention, the preferred arcing means is constructed in such a manner as to confine the arc within a much smaller volume and hence obtain arc temperatures higher than 9,000° C.

To confine this arc 21 within a small enough volume to achieve these temperatures, a suitable fluid, such as water 23, is introduced under pressure into chamber 19 from inlet hose 17 and through a tangentially arranged nozzle 22 so as to whirl or circulate concentrically at high speed about arc 21 as best shown in Fig. 2. A relatively large rotating column of fluid 23 is thus formed about arc 21 having an inner surface confining the arc within a relatively small cross sectional area and thus greatly increasing its current density and hence temperature. This rather large column of water also serves to cool all portions of the chamber and electrodes, since it is being continuously introduced under high pressure into the chamber, thereby eliminating the need for water jackets or other cooling means and enabling the arc chamber and mechanism to be reduced in size and occupy a volume preferably little greater than the size of the human hand.

In addition to confining the arc and hence greatly increasing its temperature, portions of the circulating fluid enter and become part of the arc which are heated and directed through the central opening in ring electrode 14 to form an arc plasma 15 that is transmitted outside of the torch. Although the exact nature of this action is not known, observation and theory indicate that when water is employed as a fluid, the portions of the circulating fluid near the arc 21 are heated and vaporized, and the vapor enters the arc stream and is propelled through the opening in electrode 14 due to the extreme temperature and considerable vapor pressure. After entering this arc stream, this water vapor initially becomes super heated steam and then decomposes into molecules of hydrogen and oxygen and finally ionizes into charged ions. Additionally, if electrodes 20 and 14 are made of graphite or other carbonacious material, ionized carbon, resulting from the erosion of these electrodes, is also introduced into the stream. As a result, an extremely high temperature plasma 15 containing the ionized constituents of the fluid, as well as particles from the electrodes, is propelled through the opening of negative electrode nozzle 14 outwardly from the arc torch mechanism.

As is believed evident from the above, variations may be made in the electrode material and in the type of fluid 23 to obtain variations in the composition of plasma 15 as may be desired for different applications. For example, instead of using graphite electrodes, other materials such as metal or metal coated materials may be used. Similarly, oxygen, nitrogen, or other gases, liquids or liquefied gases may be used to confine the arc depending upon whether it is desired to provide an oxidizing flame, a reducing flame, or a plasma of given composition for most effectively working with different materials or different applications of the same material. With all of such fluids, however, this circulating column is preferably rotated at relatively high speed and is provided in sufficient volume to effectively thermally insulate the housing from the high temperature arc 21 thereby enabling the housing to be constructed of light-weight transparent plastic or other materials whose only requirement is sufficient thickness and strength for the uses intended. This feature is to be particularly contrasted with known arc torch constructions which employ thick, heavy, and heat resistant housing structures together with water jackets or other auxiliary mechanisms for cooling the housing structure.

A second chamber 24 is provided adjacent the arc chamber to receive the overflow fluid 23 that may escape through the opening between the housing wall and the tip of rod electrode 20. This chamber 24 drains into outlet hose 18 and the fluid may be repumped under pressure back into inlet hose 17, if desired. At the rear of drain chamber 24 is provided a leaf type sealing means 25 to prevent the fluid from escaping into the rear mechanism of the torch while permitting axial movement of rod electrode 20 toward and away from ring electrode 14.

The remaining portions of the preferred device depicted in Fig. 1 comprises a mechanism for receiving the positive rod electrode 20 and automatically feeding this electrode forwardly toward negative ring electrode 14 as it becomes progressively eroded by the arc 21 and additionally rotating this rod about its longitudinal axis in an automatic manner to insure that erosion of its forward tip is uniform. All of this is for the purpose of maintaining flame plasma 15 constant over substantially continuous long time intervals.

As shown by Figs. 1 and 3, this feeding mechanism preferably includes a pair of opposed rollers 26 and 27 positioned on opposite sides of rod electrode 20 and so formed as to firmly grip the rod. Upper roller 26 is preferably provided with gear teeth (not shown) and adapted to be driven by a gear 28, mounted on shaft 29, which in turn is driven by movement of a spur gear 30 mounted on this shaft. Lower roller 27 is mounted to rotate with shaft 31 which is rotatably supported in a U-shaped yoke 32 that is urged by a spring 33 so as to tightly engage rod electrode 20 and insure that the rod electrode 20 is tightly held between rollers 26 and 27. As thus far described it is evident that as upper roller 26 is driven by spur gear 30, rod electrode 20 is axially positioned toward or away from ring electrode 14.

To simultaneously rotate rod electrode 20 as it is positioned toward ring electrode 14 and thus provide uniform erosion of its tip by the arc, both rollers 26 and 27 are supported within a generally cylindrically shaped frame member 34 (Fig. 3) which in turn is rotatably supported within housing 11 by means of bearings 35 and 36 as best shown in Fig. 1.

Thus is observed that frame member 34 may rotate within the rear portion of housing 11 about a central axis passing through the housing and coincident with the axis of rod electrode 20.

For rotating frame member 34 about bearings 35 and 36, a direct current motor is provided having field windings fastened about poles 37 peripherally affixed about the inside of housing 11, and having armature windings 38 and commutator bars 39 peripherally supported about a forward portion of frame 34 to rotate with frame 34.

Upon applying power to the armature 38 and field windings 37, frame mechanism 34 is rotated about the central axis passing through housing 11, and in rotating continuously turns rod 20 about its axis. As this frame member 34 rotates, gear 30 meshes with a spur gear 42, which as shown is affixed to housing 11, thereby serving to rotate shaft 29 and gear 28 and position roller 26. Since roller 26 engages rod electrode 20, rotation of roller 26 axially positions rod 20 toward and away from negative ring electrode 14; and as a result, rod electrode 20 is both axially positioned toward negative ring electrode 14 and simultaneously rotated about its longitudinal axis.

The application of power to electrodes 20 and 14 and the automatic positioning of these electrodes so as to achieve uniformity in the generated flame 15 is shown by the electrical schematic of Fig. 5. A power source is applied across electrodes 14 and 20 upon closing master switch 45, and this switch also operates an electrically operated valve (not shown) to enable introduction of the water or other fluid to inlet hose 17. Assuming electrodes 14 and 20 have been initially positioned properly, a high temperature arc 21 is struck between these electrodes and this arc is stabilized and confined by the circulating wall of water 23. To measure the arc current a fixed resistor 44 is placed in series with the electrodes and the voltage across this resistor is accordingly a measure of the arc current. Since it is desired to maintain a constant arc current, and hence maintain flame plasma 15 uniform, this voltage is applied to a comparing circuit, generally designated 43, whose function is to energize a field winding 37, controlling the energization of motor 40. Accordingly, comparing circuit 43 reversibly varies the energization of the motor field winding 37 whenever the arc current exceeds or falls below a pre-determined value; to variably energize motor 40 to adjust the distance between the end of rod electrode 20 and ring electrode 14 to maintain a substantially constant arc current. Hand grip switch 13 is, of course, placed in series with motor armature winding 38 to enable this automatic action to take place under the control of the human operator and to disable this automatic positioning mechanism to permit initial positioning of the electrodes for initially striking the arc.

To facilitate initially striking arc 21, it is preferred to sharpen the forward tip of electrode 20 by suitable means such as a sharp bladed member 51 within a container 50 resembling the well known "pencil sharpener" arrangement (as best shown in Fig. 4) and thereafter to position this pointed electrode close to negative electrode 14 before applying power. After arc 21 is struck, the pointed end of rod electrode 20 is burned away and the rod electrode 20 is eroded by the arc until it assumes the spaced position shown in Fig. 1. At this time, the human operator may actuate hand grip switch 13 to enable automatic positioning of rod electrode 20 as described above for the purpose of insuring a constant uniform flame plasma 15.

To enable visual observation of the electrode positions by the human operator, the arc chamber enclosure member 19 is preferably formed of a plastic or other transparent material of cylindrical shape sandwiched between a forward wall of housing 11 and an end plate 46 by means such as a series of bolts 48 and nuts 49 passing through the periphery of plate 46. These bolts 48 may also support electrode gripping member 47 which removably holds ring electrode nozzle 14 within a central opening in plate 46, as shown in Fig. 1, to permit ready replacement or substitution of this electrode 14 as may be desired.

Although but one preferred means for carrying out the present invention has been described and illustrated in accordance with the patent laws, it is believed evident to those skilled in the art that many variations and changes may be made without departing from the spirit and scope of this invention. Accordingly, this invention is to be considered as being limited only by the following claims appended hereto.

What is claimed is:

1. A portable electrical torch including a housing, a pair of electrodes supported within said housing and energizable by a power source to transmit an arc therebetween, means forming a continuously moving mass of fluid about said arc and the portions of said electrodes in contact therewith, the cross sectional thickness of said fluid mass being considerably greater than the cross section of said arc and moving at a rate such that the housing is thermally insulated from said arc, and means responsive to the magnitude of the arc electrical current for regulating the distance between said electrodes to maintain said current substantially constant.

2. A portable arc plasma torch comprising a housing having a drain chamber formed therein; wall means mounted on the housing to form a cylindrical chamber; an annular electrode nozzle mounted in said wall means; means for introducing into said cylindrical chamber, substantially tangentially to the walls of said chamber, a fluid under pressure; means for draining fluid collecting in said drain chamber; a rod electrode having a longitudinal axis; electric motor means mounted in said housing for rotating said rod electrode about its longitudinal axis and for causing said rod electrode to move, in a direction parallel to its longitudinal axis, through said drain chamber and into said cylindrical chamber, toward, or away from, said electrical nozzle; means for connecting a source of electric power to said rod electrode and said annular nozzle electrode to establish an electrical arc between them; and control means responsive to the magnitude of the current flowing between the rod electrode and the nozzle electrode for substantially continuously, adjusting the minimum distance between the rod electrode and the nozzle electrode, to maintain the magnitude of said current flow substantially constant; whereby, the characteristics of the arc plasma produced by the torch are substantially uniform with time.

3. An arc plasma torch comprising a housing, a drain chamber formed in said housing, a hollow cylindrical member, an end plate, means for securing the cylindrical member and the end plate to the housing to form a cylindrical chamber, an opening in said housing permitting communication between the drain chamber and the cylindrical chamber, an opening in the end plate, a nozzle electrode mounted in the opening in the end plate, means for introducing a pressurized fluid into the cylindrical chamber, means for causing the fluid to flow substantially tangentially to the walls of the cylindrical member, a reversible electric motor having field windings mounted within said housing and an armature mounted for rotations within said housing about an axis of rotation which extends through the opening between the drain chamber and the cylindrical chamber and the electrodes nozzle, a rod electrode having a longitudinal axis, circuit means for connecting a source of electric power to the rod electrode and the nozzle electrode to establish an electrical arc between them, a pair of rollers mounted in opposition on said armature for holding the rod electrode so that its longitudinal axis substantially coincides with the axis of rotation of the armature, gear means between one of said rollers and the housing for causing said rollers to move the rod electrode in the direction of its longitudinal axis as the armature rotates, and circuit means including a resistor, through which current flowing between the rod electrode and the nozzle electrode also flows, for supplying current to the field windings of the motor to vary the speed and direction of rotation of the armature to adjust the position of the rod electrode with respect to the nozzle electrode to maintain the magnitude of the current flowing between the electrodes substantially constant.

References Cited in the file of this patent

UNITED STATES PATENTS

| 1,002,721 | Mathers | Sept. 5, 1911 |
| 1,302,488 | Sperry | Apr. 29, 1919 |
| 1,493,849 | Eschholz et al. | May 13, 1924 |
| 1,638,336 | Hines | Aug. 9, 1927 |
| 1,892,325 | Wist | Dec. 27, 1932 |
| 2,200,632 | Mills | May 14, 1940 |
| 2,390,816 | Suits | Dec. 11, 1945 |
| 2,504,868 | Muller et al. | Apr. 18, 1950 |
| 2,768,279 | Rava | Oct. 23, 1952 |
| 2,769,079 | Briggs | Oct. 30, 1956 |

FOREIGN PATENTS

| K17,808 | Germany | June 14, 1956 |

OTHER REFERENCES

Zeitschrift fur Physik Bd. 138, S170–182 (1954).